(12) United States Patent
Drees et al.

(10) Patent No.: US 10,702,092 B2
(45) Date of Patent: Jul. 7, 2020

(54) COFFEE MAKER WITH MULTIPLE BREWING METHODS

(71) Applicant: WHIRLPOOL CORPORATION, Benton Harbor, MI (US)

(72) Inventors: Steven C. Drees, Stevensville, MI (US); Meighan McLaughlin, Stevensville, MI (US); Dean A. Peppel, Stevensville, MI (US); Joseph Snyder, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 199 days.

(21) Appl. No.: 15/914,331

(22) Filed: Mar. 7, 2018

(65) Prior Publication Data
US 2018/0263405 A1    Sep. 20, 2018

Related U.S. Application Data

(60) Provisional application No. 62/473,031, filed on Mar. 17, 2017.

(51) Int. Cl.
*A47J 31/20* (2006.01)
*A47J 31/057* (2006.01)
(Continued)

(52) U.S. Cl.
CPC .............. *A47J 31/20* (2013.01); *A23F 5/262* (2013.01); *A47J 31/0573* (2013.01); *A47J 31/06* (2013.01); *A47J 31/10* (2013.01); *A47J 31/18* (2013.01)

(58) Field of Classification Search
CPC ........ A47J 31/20; A47J 31/06; A47J 31/0573; A23F 5/262
See application file for complete search history.

(56) References Cited

U.S. PATENT DOCUMENTS 5,913,961 A * 6/1999 Chmiel ................. A47J 31/605
99/286
7,698,992 B2   4/2010 Wei
(Continued)

FOREIGN PATENT DOCUMENTS

CN    103040359 A    4/2013
DE   102015217183 A1  3/2016
(Continued)

OTHER PUBLICATIONS

English Translation for CN103040359 published Apr. 2013.*

*Primary Examiner* — Anthony J Weier
(74) *Attorney, Agent, or Firm* — Price Heneveld LLP

(57) ABSTRACT

A brewing device includes a base portion with a support surface. A carafe is configured to be selectively supported on the support surface. A filter basket is removeably supported on an upper portion of the carafe. An immersion chamber is fluidically coupled to an outlet disposed over the filter basket. A water reservoir is fluidically coupled to both the immersion chamber and the outlet disposed over the filter basket. A pump is in fluid communication with the water reservoir and operable to selectively advance water to one of the outlet disposed over the filter basket and the immersion chamber from the water reservoir. The brewing device is configured to brew a beverage using a pour-over brewing method, an immersion brewing method, or a filtered immersion brewing method.

16 Claims, 9 Drawing Sheets

(51) Int. Cl.
*A47J 31/06* (2006.01)
*A47J 31/18* (2006.01)
*A47J 31/10* (2006.01)
*A23F 5/26* (2006.01)

(56) References Cited

U.S. PATENT DOCUMENTS

| | | |
|---|---|---|
| 8,087,346 B2 | 1/2012 | Webster et al. |
| 9,433,316 B2 | 9/2016 | Picozza et al. |
| 2006/0278091 A1* | 12/2006 | Rutigliano ............ A47J 31/446 99/279 |
| 2014/0013958 A1 | 1/2014 | Krasne et al. |
| 2016/0198886 A1 | 7/2016 | Avins et al. |

FOREIGN PATENT DOCUMENTS

| | | |
|---|---|---|
| EP | 3132724 A1 | 2/2017 |
| WO | 2015069491 A1 | 5/2015 |

\* cited by examiner

COFFEE MAKER WITH MULTIPLE BREWING METHODS

CROSS REFERENCE TO RELATED APPLICATION

This present application claims the benefit of U.S. Provisional Application No. 62/473,031, entitled "COFFEE MAKER WITH MULTIPLE BREWING METHODS" filed on Mar. 17, 2017, the entire contents of which are incorporated by reference.

FIELD

The present concept generally relates to a coffee maker, and more particularly, to a coffee maker having various brewing capabilities.

BACKGROUND

Generally, a coffee maker is limited to a particular brewing technique or procedure in order to make a brewed beverage. Thus, if a user would like to use different brewing techniques to make different styles of a brewed beverage, a user will generally have to purchase a number of different brewing devices. Thus, a single brewing device having the capability of using multiple different brewing techniques is desired.

SUMMARY

One aspect of the present concept includes a brewing device having a base portion with a support surface. A carafe is configured to be selectively supported on the support surface. A filter basket is positioned above the carafe. An immersion chamber is fluidically coupled to an outlet disposed over the filter basket. A water reservoir is fluidically coupled to both the immersion chamber and the outlet disposed over the filter basket. A pump is in fluid communication with the water reservoir and operable to selectively advance water to one of the outlet disposed over the filter basket and the immersion chamber from the water reservoir.

Another aspect of the present concept includes a brewing device having a housing with a base portion and an upper portion with a vessel receiving area disposed therebetween. The upper portion includes an outlet opening into the vessel receiving area. A carafe is configured to be selectively received in the vessel receiving area. A filter basket is removeably supported on the carafe. An immersion chamber is removeably supported on the upper portion of the housing and includes a cavity with a filter plate. The filter plate includes an outlet disposed therethrough. A water reservoir is supported on the upper portion of the housing. A pump is in fluid communication with the water reservoir and operable to selectively advance water to one of the outlet opening into the vessel receiving area and the cavity of the immersion chamber from the water reservoir.

Yet another aspect of the present concept includes a method of making a brewed beverage. The method includes the steps of providing a brewing device, such as a coffee maker, having a housing with a base portion and an upper portion with a vessel receiving area disposed therebetween. An outlet is disposed on the upper portion of the housing and opens into the vessel receiving area. An immersion chamber and a water reservoir are supported on the housing. A pump is fluidically coupled with both the immersion chamber and the water reservoir. A carafe is configured to be selectively received in the vessel receiving area of the housing, and a filter basket is removeably supported on the carafe. The method includes the steps of 1) introducing a volume of water to the water reservoir; 2) heating the volume of water in the water reservoir; 3) introducing a first volume of a solid particulate to one of the immersion chamber and the filter basket; 4) pumping a portion of the water from the water reservoir to one of the immersion chamber and the filter basket; 5) infusing the water with the solid particulate for a predetermined amount of time to brew a brewed beverage; and 6) introducing the brewed beverage into the carafe.

These and other features, advantages, and objects of the present device will be further understood and appreciated by those skilled in the art upon studying the following specification, claims, and appended drawings.

DETAILED DESCRIPTION OF EMBODIMENTS

Figure 1:
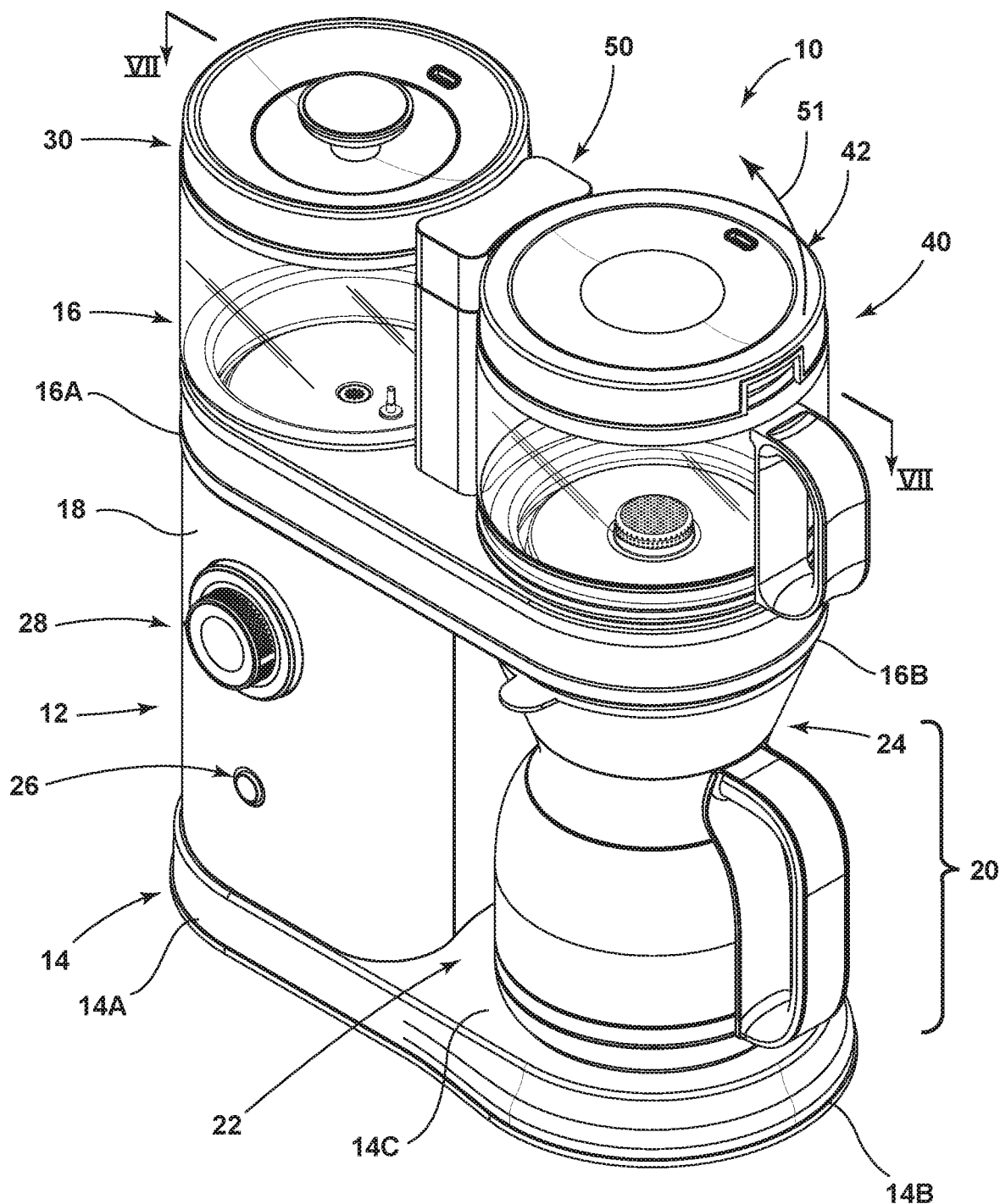
FIG. 1 is a front perspective view of a coffee maker having a carafe received in a carafe receiving area of a housing and a water reservoir and an immersion chamber supported on an upper portion of the housing.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally designates a brewing device according to one embodiment of the present concept. Specifically, the brewing device 10 shown in FIG. 1 is a brewing device configured to make a brewed beverage. As used throughout this disclosure, the term "brewing device" may be interchangeably used with the term "coffee maker", wherein both terms are used throughout to identify an apparatus configured to make a brewed beverage. As such, the coffee maker 10 of the present invention may be referred to as a coffee maker or brewing device/apparatus, but is not intended to limit the scope of the invention to a device that makes coffee, but rather an apparatus configured to make a brewed beverage in general.

As further shown in FIG. 1, the coffee maker 10 includes a base portion 14 and an upper portion 16 within an intermediate housing portion 18 disposed therebetween. The base portion 14 includes a first end 14A and a second end 14B, while the upper portion 16 includes a first end 16A and a second end 16B. The first ends 14A, 16A of the base portion 14 and upper portion 16 of the housing 12 are interconnected by the intermediate housing portion 18. The second ends 14B, 16B of the base portion 14 and upper portion 16 extend outwardly from the intermediate housing portion 18 to define a carafe receiving area 20 therebetween. As shown in FIG. 1, the carafe receiving area 20 is configured to receive a carafe 22 therein. The carafe 22 is supported on a support surface 14C of the base portion 14 disposed at the second end 14B of the base portion 14. The carafe 22 shown in FIG. 1 is shown supporting a removable filter basket 24. The filter basket 24 may be supported on the carafe 22 or on the upper portion 16 of the housing 12, so long as the filter basket 24 is positioned above the carafe 22. The carafe 22 is selectively removable from the carafe receiving area 20 of the housing 12 and is configured to receive a brewed beverage during a brewing procedure. The single carafe 22 of the coffee maker 10 is configured to receive a brewed beverage regardless of the brewing method selected by a user. The intermediate housing portion 18 of the housing 12 is contemplated to house a number of components of the coffee maker 10, such as an on/off button 26 and a rotatory dial 28 which defines a user interface for the coffee maker 10. The intermediate housing portion 18 is further configured to conceal internal components of the coffee maker 10, such as pumps, motors, heating elements, power sources, controllers, and other such components used to operate the coffee maker 10. Specific components incorporated into the housing 12 of the present concept are further described below.

Figure 2:
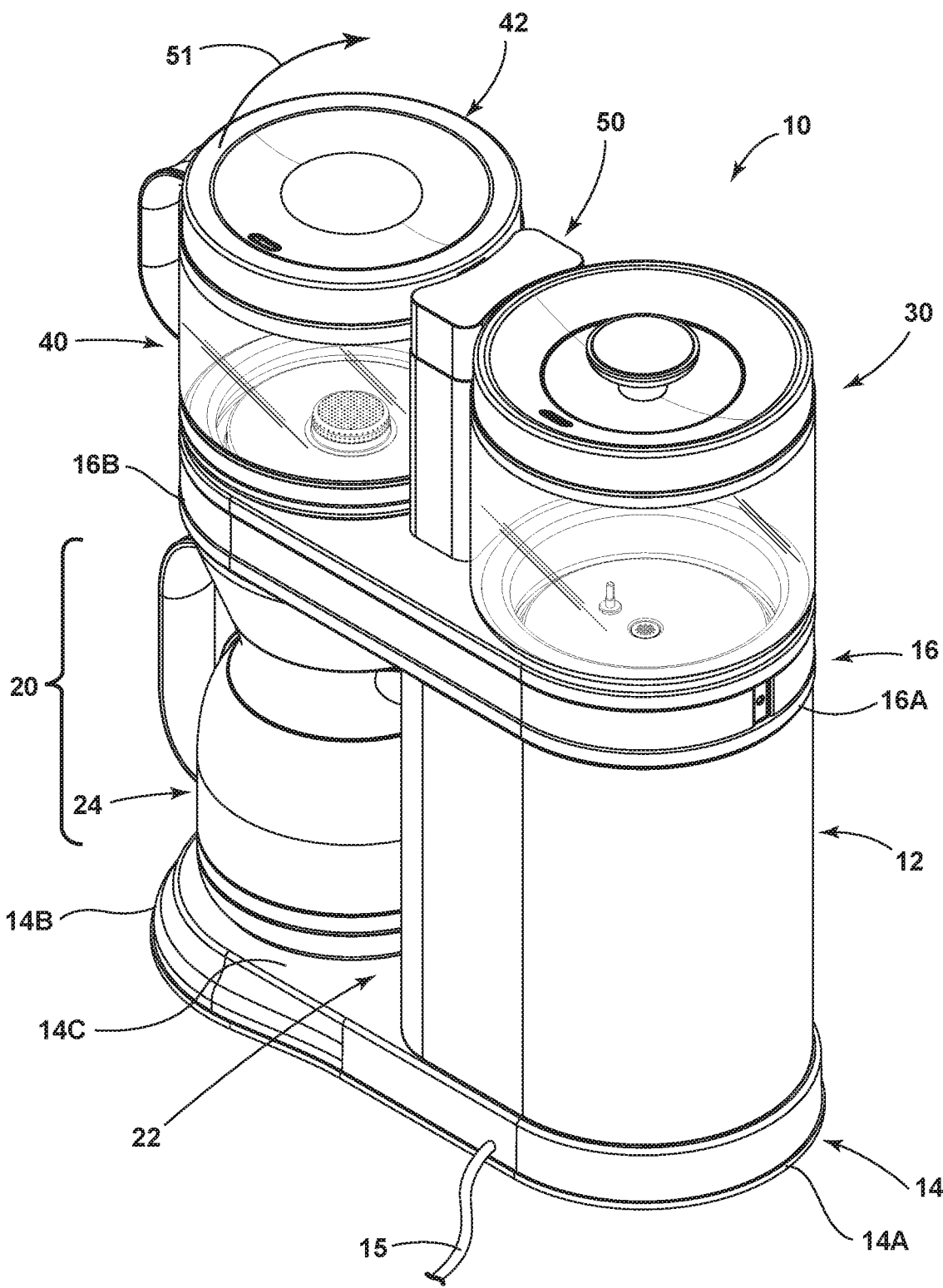
FIG. 2 is a rear perspective view of the coffee maker of FIG. 1.

With further reference to FIG. 1, a water reservoir 30 is shown supported on the first end 16A of the upper portion 16 of the housing 12. An immersion chamber 40 is shown disposed on the second end 16B of the upper portion 16 of the housing 12. In use, the water reservoir 30 is configured to hold a volume of water and heat the water to a specific temperature for use in various brewing techniques. The immersion chamber 40 is configured to hold any kind of dry/solid particulate that is infused into the water provided from the water reservoir 30. The immersion chamber 40 may be used in specific brewing techniques, or may be bypassed by a particular brewing technique. Thus, the immersion chamber 40 provides a brewing feature that may optionally be incorporated into a brewing technique to provide a desired brewed beverage. Specific brewing techniques provided by the coffee maker 10 of the present concept are further described in detail below. As further shown in FIG. 1, a divider member 50 upwardly extends from the upper portion 16 of the housing 12 and separates the water reservoir 30 from the immersion chamber 40. In use, the divider member 50 provides a pathway to pump water to the immersion chamber 40 as well as serves as a connecting point for a lid assembly 42 of the immersion chamber 40, as further described below. FIG. 2 shows another view of the coffee maker 10 of FIG. 1. In FIG. 2, a power cord 15 is shown on the base portion 14 of the housing 12. The power cord 15 is contemplated to connect to a power source, such as a standard receptacle, for powering the coffee maker 10.

Figure 3:
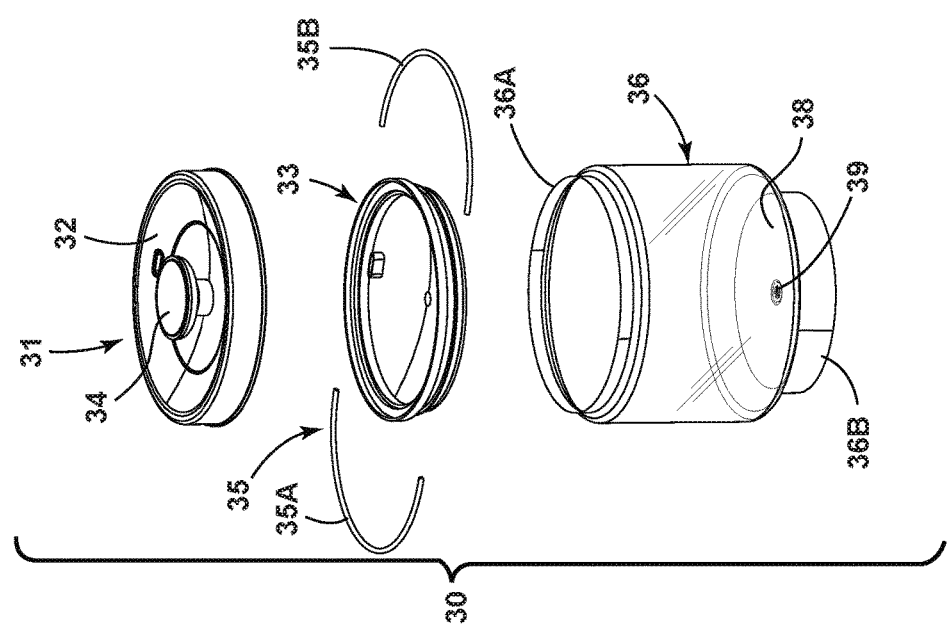
FIG. 3 is a top exploded view of the water reservoir of FIG. 1.

Referring now to FIG. 3, the water reservoir 30 includes a lid assembly 31 having an outer portion 32 and an inner portion 33. In assembly, the inner portion 33 is received within the outer portion 32 and includes a seal assembly 35, which is shown in FIG. 3 as a two-part seal assembly 35 having first and second portions 35A, 35B. While shown as a two-part assembly in FIG. 3, it is contemplated that the seal assembly 35 is a unitary ring part surrounding the inner portion 33. The lid assembly 31 is configured to selectively cover an open top 36A of a cavity 36 of the water reservoir 30. Thus, the lid assembly 31 is removed in order to introduce water into the cavity 36 of the water reservoir 30 in the initial steps of a brewing sequence. The outer portion 32 of the lid assembly 31 further includes a handle 34 to be engaged by a user to remove the lid assembly 31 and provide access to the cavity 36. The cavity 36 includes a base portion 36B and a base plate 38 having an outlet 39 disposed therethrough. In use, the outlet 39 is configured to provide water heated in the water reservoir 40 to various components of the coffee maker 10, as further described below.

Figure 4:
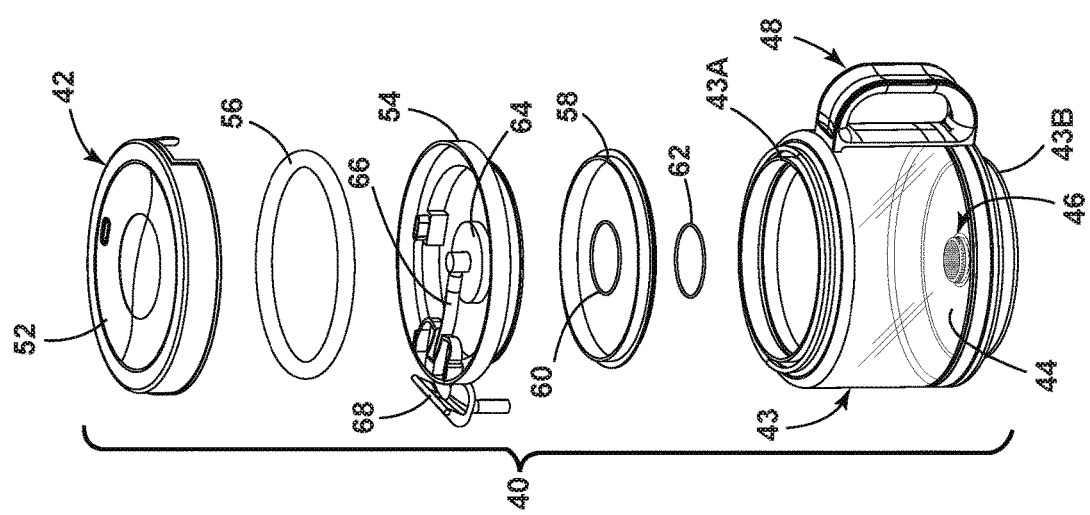
FIG. 4 is a top exploded view of the immersion chamber of FIG. 1.

Referring now to FIG. 4, an embodiment of the immersion chamber 40 is shown, wherein the lid assembly 42 is exploded away from a cavity 43 of the immersion chamber 40. The cavity 43 includes an open top 43A and a base portion 43B. The immersion chamber 40 further includes a handle assembly 48 extending outwardly from the cavity 43. A filter plate 44 is disposed at the base portion 43B and includes a filter assembly 46. In use, a solid particulate used to make a brewed beverage is introduced into the cavity 43 of the immersion chamber 40. Therein, the solid particulate can infuse water that is pumped to the immersion chamber 40 from the water reservoir 30. Specifically, water is introduced into the cavity 43 of the immersion chamber 40 through the lid assembly 42. The lid assembly 42, as shown in FIG. 4, includes an outer portion 52 and an inner portion 54 that couple to one another in assembly. A seal member 56 is coupled between the outer portion 52 and inner portion 54 in assembly. The inner portion 54 includes a lower cover 58 having an aperture 60 disposed therethrough. The aperture 60 is configured to receive an outlet 64 disposed on the inner portion 54 of the lid assembly 42. A seal ring 62 is coupled between the outlet 64 and the aperture 60 in assembly. In FIG. 4, the outlet 64 is coupled to a supply line 66 which is further connected to a pump, as further described below. The inner portion 54 of the lid assembly 42 further includes a connecting member 68 that is used to connect the lid assembly 42 to the divider member 50. In this way, the lid assembly 42 is hingedly coupled to the divider member 50 of the coffee maker 10 for pivoting movement between open and closed positions along a path as indicated by arrow 51, as shown in FIG. 1, relative to the cavity 43. In FIG. 1, the lid assembly 42 is shown in a closed position against the open top 43A of the cavity 43 of the immersion chamber 40. When the lid assembly 42 is in the closed position (FIG. 1), the outlet 64 (FIG. 4) of the lid assembly 42 is disposed over the cavity 43 and opens into the cavity 43 to direct water into the immersion chamber 40.

Figure 5:
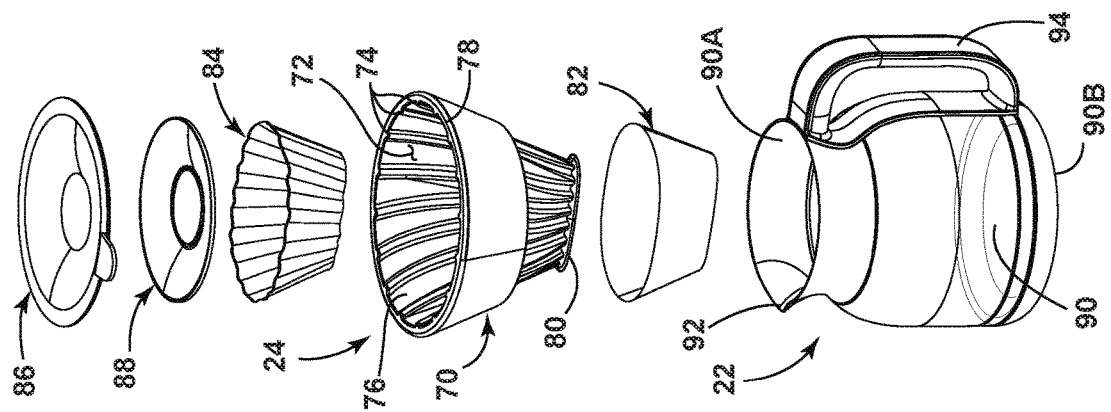
FIG. 5 is a top perspective view of the carafe of FIG. 1 with an exploded view of a filter basket disposed above the carafe.

Referring now to FIG. 5, the filter basket 24 is shown in an exploded view over the carafe 22. The filter basket 24 includes a main housing 70 having a conical-shaped cavity 72. A plurality of ridges 74 is disposed along a sidewall 76 of the main housing 70. The sidewall 76 extends downwardly from an open top portion 78 to a lower portion 80 in a tapered manner. The main housing 70 may include a lower cover 82 covering the lower portion 80 of the main housing 70 in assembly. The conical-shaped cavity 72 of the main housing 70 is configured to receive a filter assembly 84 which may be a disposable paper filter, or a reusable filter assembly known in the art. An intermediate member 88 may be used to hold the filter assembly 84 in place in the conical-shaped cavity 72 of the main housing 70. The filter basket 24 further includes an upper cover 86 that closes off the open top portion 78 of the conical-shaped cavity 72 of the main housing 70. In use, the filter assembly 84 may be used to filter contents of the immersion chamber 40 in a specific brewing sequence. Further, the filter assembly 84 may also receive a solid particulate in order to prepare a brewed beverage using a pour over brewing technique by directing water to the filter basket 24 from the water reservoir 30.

As further shown in FIG. 5, the carafe 22 includes a cavity 90 having an upper portion 90A and a base portion 90B. A handle assembly 48 extends outwardly from the cavity 90. The upper portion 90A of the carafe 22 further includes a spout 92 to direct the contents of the cavity 90 out of the carafe 22 during a pouring procedure. The base portion 90B of the carafe 22 is used to support the carafe 22 from the support surface 14C of the base portion 14 of the housing 12 as shown in FIG. 1. The upper portion 90A defines an open top of the carafe 22 and is configured to receive and support the filter basket 24 above the carafe 22. In assembly, the filter basket 24 is configured to pass liquid through the main housing 70 into the cavity 90 of the carafe 22. The liquid may be a pre-filtered brewed beverage from the immersion chamber 40, or may be heated water from the water reservoir 30 depending on the brewing technique selected by a user.

Figure 6:
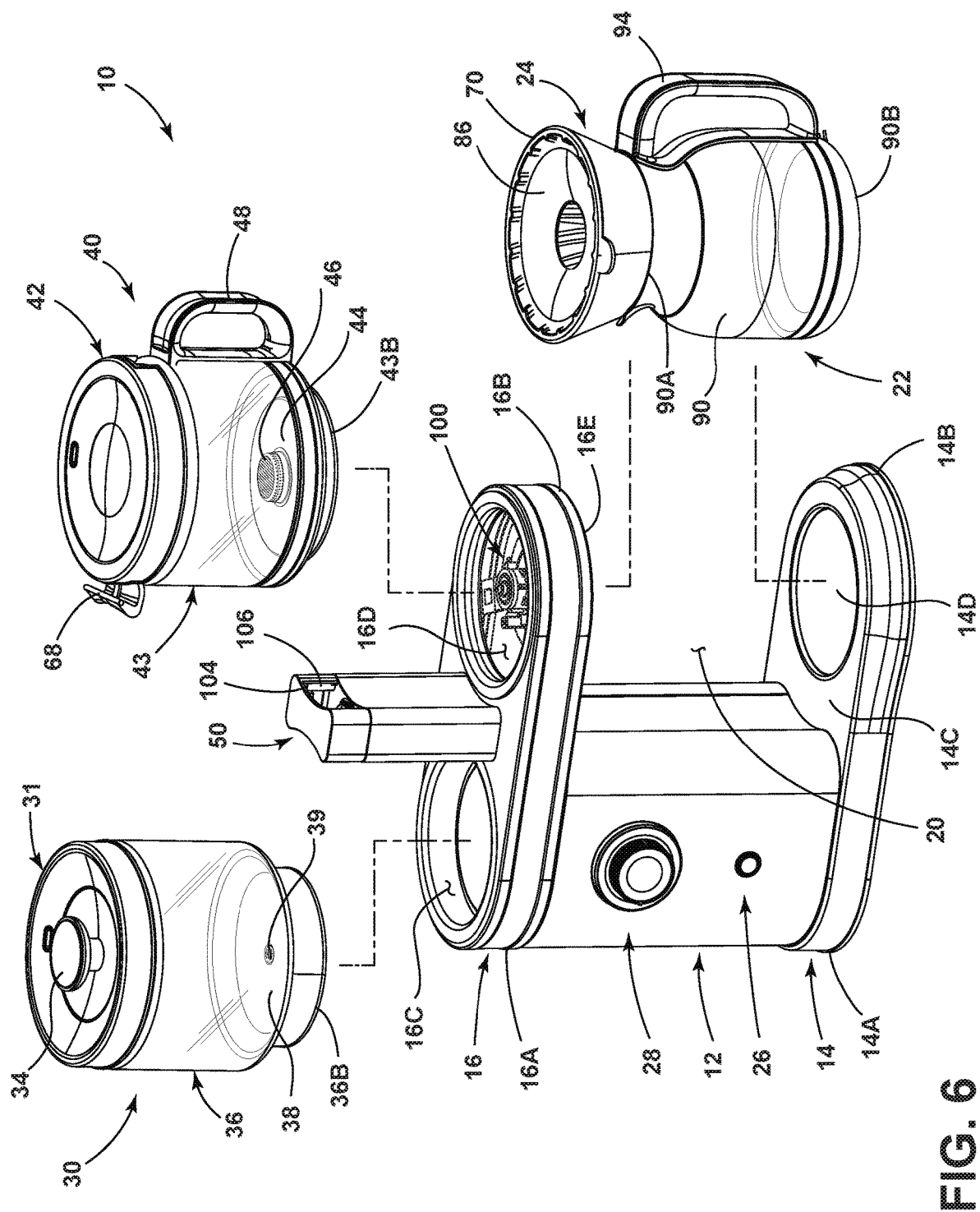
FIG. 6 is a front perspective view of the coffee maker of FIG. 1 with the water reservoir, immersion chamber and carafe exploded away from the housing.

Referring now to FIG. 6, the water reservoir 30 and the immersion chamber 40 are shown exploded away from inset portions 16C and 16D of the upper portion 16 of the housing 12, respectively. It is contemplated that the water reservoir 30 may be removeably supported or fixedly coupled to the upper portion 16 of the housing 12. It is contemplated that the immersion chamber 40 may also be removeably supported or fixedly coupled to the upper portion 16 of the housing 12. However, it is contemplated that the immersion chamber 40 will at least include removable components if not be fully removable from the upper housing 16 to facilitate the cleaning of the immersion chamber 40 by a user. As further shown in FIG. 6, the upper portion 16 of the housing 12 includes a valve assembly 100 which is contemplated to be operable between open and closed positions. The valve assembly 100 is fluidically coupled with an outlet 102 (FIG. 7) disposed on a lower surface 16E of the upper portion 16 of the housing 12. The valve assembly 100 is further coupled in a fluid manner with an outlet 45 (FIG. 7) disposed on the filter plate 44 of the immersion chamber 40. In this way, the valve assembly 100 can move to the open position to introduce liquid from the immersion chamber 40 into the filter basket 24 as further described below.

As further shown in FIG. 6, the divider member 50 is shown having an aperture 104 providing access to a connecting feature 106, to which the connecting member 68 of the lid assembly 42 of the immersion chamber 40 is coupled in assembly. Again, the lid assembly 42 of the immersion chamber 40 is operable between open and closed positions, such that the cavity 43 of the immersion chamber 40 can be removed from the upper housing 16 when the lid assembly 42 is in the open position.

As further shown in FIG. 6, the support surface 14C of the base portion 14 of the housing 12 includes an inset portion 14D in which the base portion 90B of the carafe 22 is received during a brewing sequence.

Figure 7:
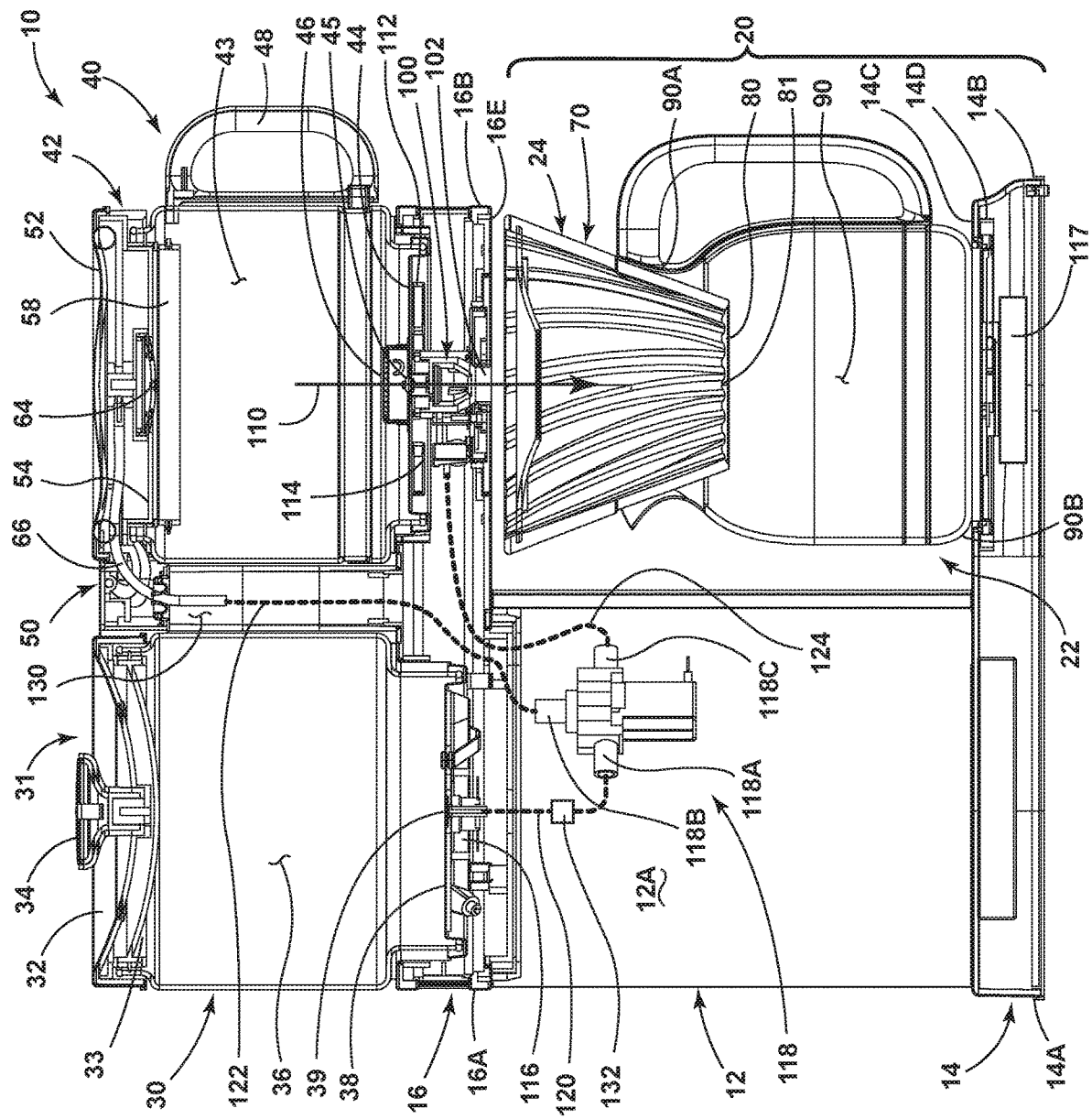
FIG. 7 is a cross-sectional view of the coffee maker of FIG. 1 taken at line VII.

Referring now to FIG. 7, the water reservoir 30 and the immersion chamber 40 are shown supported on the upper portion 16 of the housing 12. As positioned on the upper portion 16 of the housing 12, the outlet 45 of the immersion chamber 40 is shown positioned in fluid communication with the valve assembly 100 of the upper portion 16. Further, the outlet 102 of the upper portion 16 is shown positioned in fluid communication with the valve assembly 100 as well. The outlet 102 of the upper portion 16 is shown opening into the carafe receiving area 20, such that liquid can move from the cavity 43 of the immersion chamber 40 to the filter basket 24 along the path as indicated by arrow 110. The filter assembly 46 of the filter plate 44 of the immersion chamber 40 is shown covering the outlet 45 of the immersion chamber 40. In this way, liquid exiting the immersion chamber 40 through the outlet 45 is filtered by the filter assembly 46. The filter plate 44 is further coupled to heating elements 112, 114 which can be used to heat a water and solid particulate mixture disposed in the cavity 43 of the immersion chamber 40 during a specific brewing sequence. A filtered liquid can then move to the cavity 72 of the main housing 70 of the filter basket 24 from the immersion chamber 40, and through to the cavity 90 of the carafe 22 through an outlet 81 disposed on the lower portion 80 of the main housing 70. In FIG. 7, the carafe 22 is shown with the base portion 90B received in the inset portion 14D of the base portion 14 of the housing 12. The inset portion 14C is shown coupled to a heating element 117 to heat the contents of the carafe 22.

As further shown in FIG. 7, a heating element 116 is shown coupled to the base plate 38 of the water reservoir 30. In this way, a volume of water introduced to the cavity 36 of the water reservoir 30 can be heated and retained within the water reservoir 30 for use in a brewing sequence. The outlet 39 of the water reservoir 30 is shown coupled to a supply line 120 which fluidically couples the water reservoir 30 with a pump 118. In the embodiment shown in FIG. 7, the pump 118 is disposed within an internal cavity 12A of the housing 12 and includes a number of ports 118A-118C that fluidically couple various components of the coffee maker 10 to one another using supply lines 120, 122 and 124. It is contemplated that the pump 118 may include any number of ports that facilitate movement of water to various parts of the coffee maker 10 using any number of supply lines necessary. Specifically, in the embodiment shown in FIG. 7, supply line 120 fluidically couples the water reservoir 30 with the pump 118, while supply line 122 fluidically couples the immersion chamber 40 with the pump 118. Supply line 124 fluidically couples the pump 118 with the filter basket 24 using outlet 102 disposed on the under surface 16E of the upper portion 16 of the housing 12. As shown in FIG. 7, supply line 122 couples with supply line 66 of the lid assembly 42 of the immersion chamber 40 to supply water from the water reservoir 30 to the immersion chamber 40 through outlet 64 disposed in the lid assembly 42 of the immersion chamber 40. Specifically, supply line 122 is routed through an internal raceway 130 of the divider member 50 to fluidically couple the lid assembly 42 with the pump 118. In the embodiment shown in FIG. 7, a flow meter 132 is coupled between the water reservoir 30 and the pump 118 to monitor the amount of water pumped by the pump 118 to the filter basket 24 or the immersion chamber 40.

As further shown in FIG. 7, the filter basket 24 is shown removeably supported above the carafe 22 on the upper portion 90A of the cavity 90 of the carafe 22. As noted above, it is further contemplated that the filter basket 24 may be removeably coupled to the lower surface 16E of the upper portion 16 of the housing 12 in a slide-in connecting manner to position the filter basket 24 above the carafe 22. In such an embodiment, it is contemplated that the housing 70 may include a rim portion near the open top portion 78 thereof that is configured to be received in one or more tracks disposed on the lower surface 16E of the upper portion 16 of the housing 12 to receive and support the filter basket 24 above the carafe 22.

Figure 8:
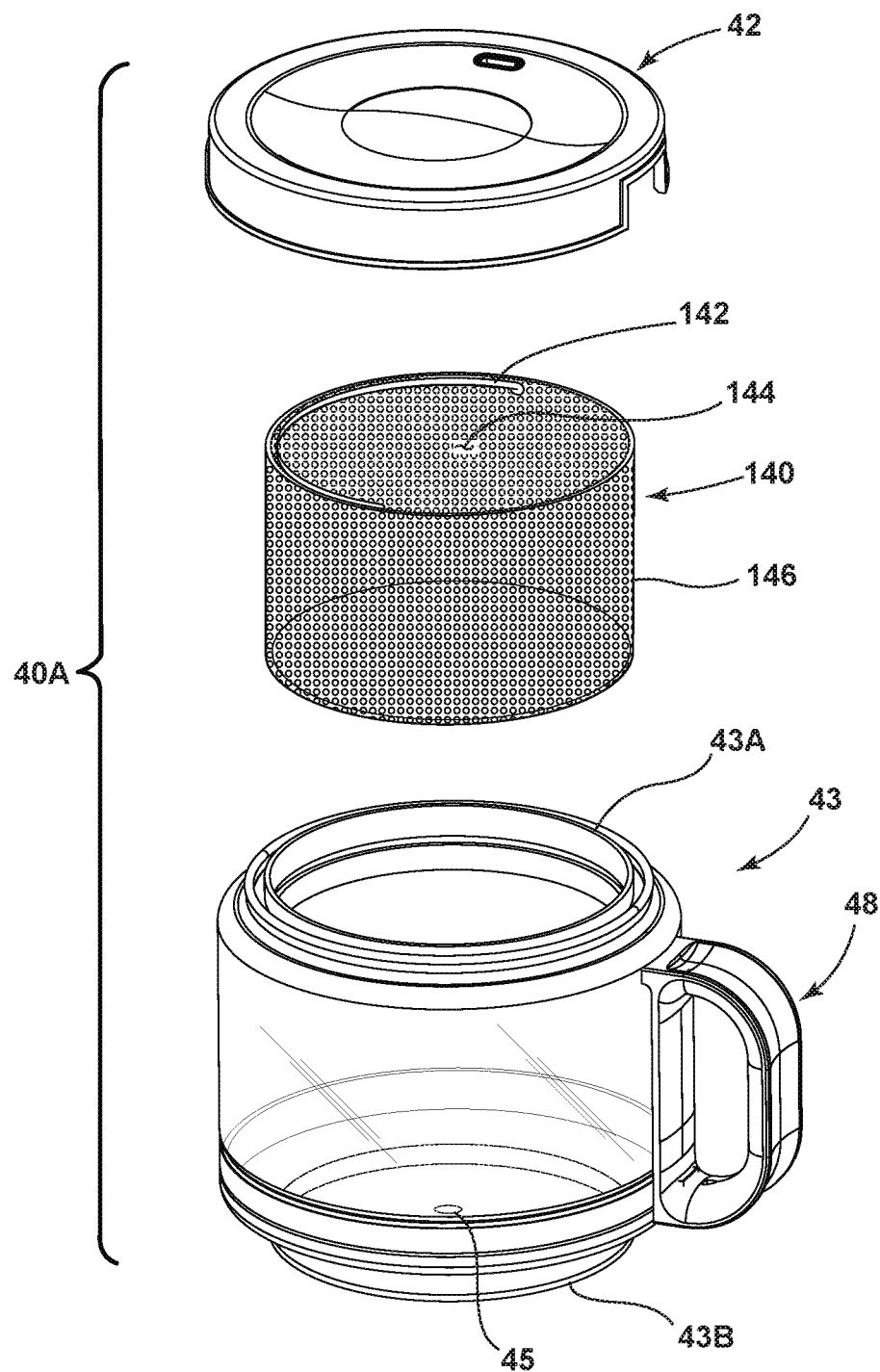
FIG. 8 is an exploded top perspective view of another embodiment of an immersion chamber.

Referring now to FIG. 8, another embodiment of immersion chamber 40A is shown, in which the cavity 43 of the immersion chamber 40A is configured to receive a removable filter enclosure 140 having perforated sidewalls 146 which define a cavity 144. The removable filter enclosure 140 further includes a handle assembly 142 that is used to remove the removable filter enclosure 140 when the lid assembly 42 is in an open position. In use, a solid particulate is introduced into the cavity 144 of the removable filter enclosure 140 and water is introduced into the cavity 43 of the immersion chamber 40A through the lid assembly 42 in order to infuse the water with the solid particulate in preparing a brewed beverage.

Figure 9:
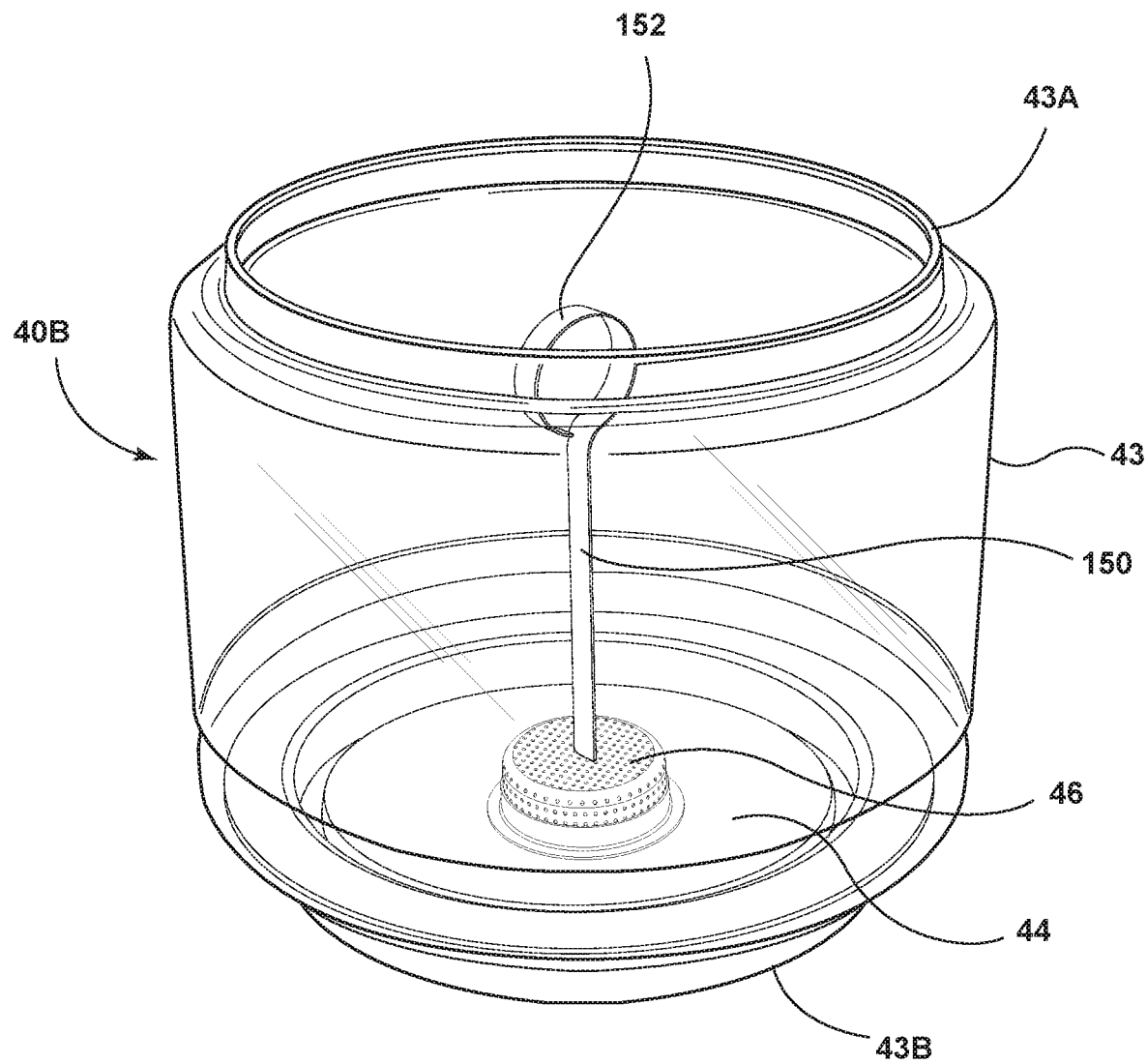
FIG. 9 is a top perspective view of another embodiment of an immersion chamber.

Referring now to FIG. 9, another embodiment of an immersion chamber 40B is shown. In the embodiment shown in FIG. 9, the immersion chamber 40B includes a handle assembly 150 extending upwardly from the filter plate 44. Specifically, the handle assembly 150 extends upwardly from the filter assembly 46 of the filter plate 44. In the embodiment shown in FIG. 9, the handle assembly 150 includes a circular top portion 152 for engagement by a user to remove the filter plate 44 or the cavity 43 from the coffee maker 10 for cleaning.

Figure 10:
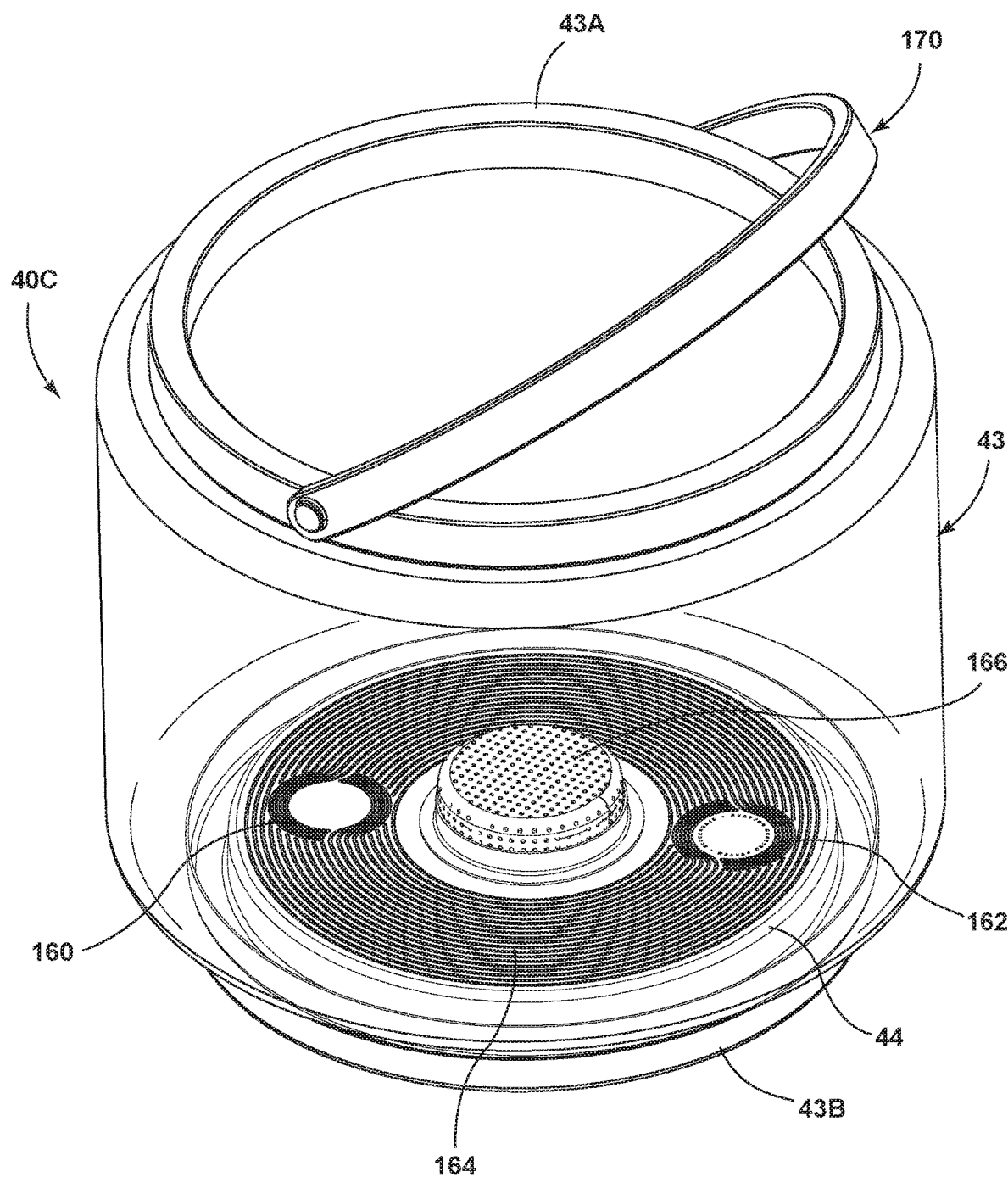
FIG. 10 is a top perspective view of another embodiment of an immersion chamber.

Referring now to FIG. 10, another embodiment of an immersion chamber 40C is shown, wherein the filter plate 44 includes one or more filter assemblies. Specifically, the filter plate 44 shown in FIG. 10 includes a planar body portion with indicia 160, 162 and 164 disposed on an upper surface thereof. A central filter assembly 166 upwardly extends from upper surface of the planar body portion of the filter plate 44 and is contemplated to cover the outlet 45 of the immersion chamber 40C similar to the configuration shown in the immersion chamber 40 of FIG. 7. As further shown in FIG. 10, a pivoting handle assembly 170 is coupled to the upper portion 43A of the cavity 43 of the immersion chamber 40C and extends outwardly therefrom. The handle assembly 170 is configured to be engaged by a user to remove the immersion chamber 40C from the coffee maker 10 for cleaning. The handle assembly 170 is configured to be concealed by the lid assembly 42 when the lid assembly 42 is in the closed position as shown in FIG. 11.

Figure 11:
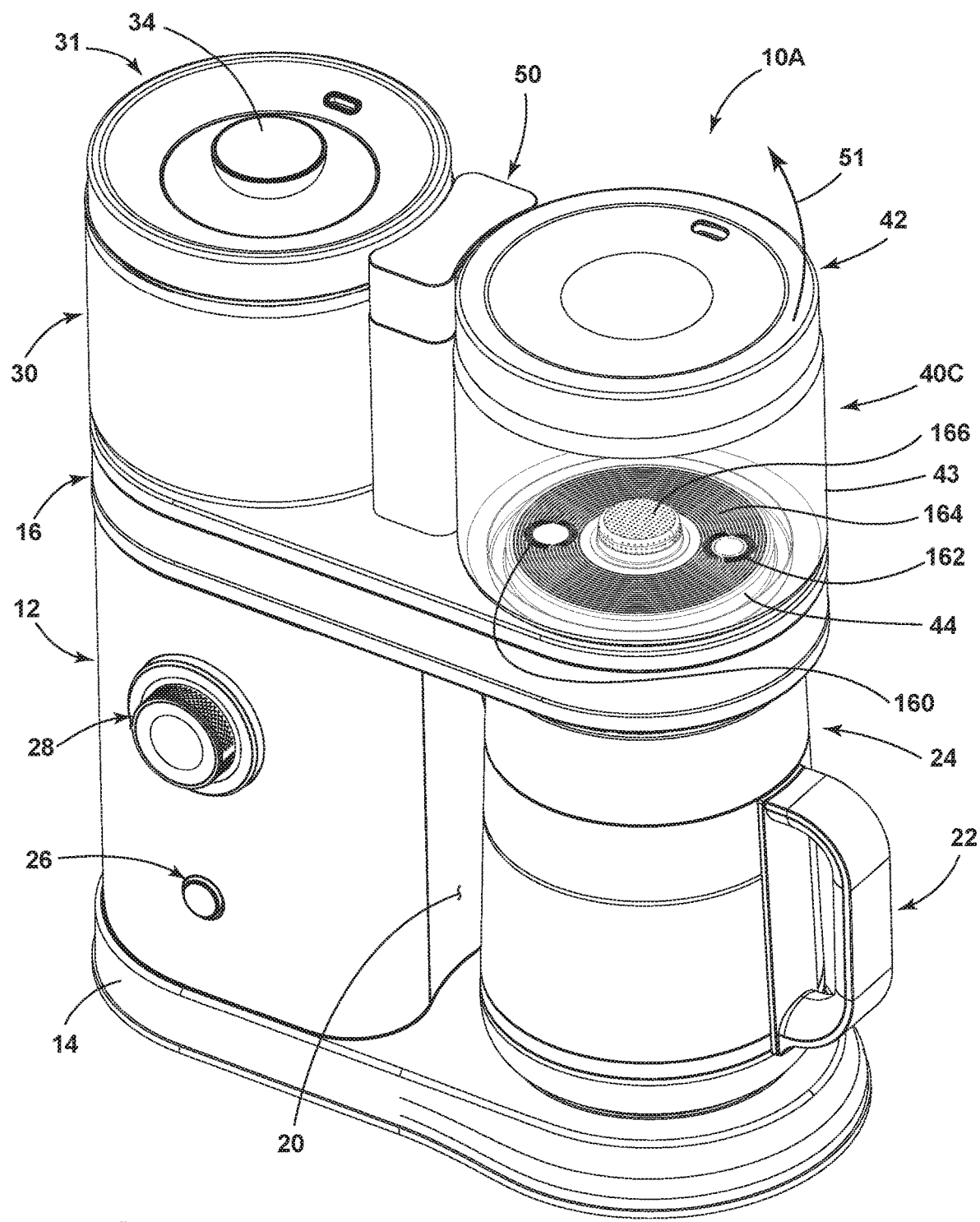
FIG. 11 is a top perspective view of a coffee maker having the immersion chamber of FIG. 10.

Referring now to FIG. 11, another embodiment of a coffee maker 10A is shown having the immersion chamber 40C of FIG. 10 disposed on the upper portion 16 of the housing 12. In FIG. 11, the handle assembly 170 (FIG. 10) of the immersion chamber 40C is fully concealed by the lid assembly 42 when the lid assembly 42 is in the closed position on the cavity 43 of the immersion chamber 40C.

A method of brewing a beverage using the coffee maker 10 will now be described. The method includes the steps of providing a brewing device 10, such as the coffee maker 10 of FIG. 1, having a housing 12 with a base portion 14 and an upper portion 16 with a vessel receiving area 20 disposed therebetween. An outlet 102 (FIG. 7) is disposed on the upper portion 16 of the housing 12 and opens into the vessel receiving area 20. An immersion chamber 40 and a water reservoir 30 are supported on the housing 12. A pump 118 is fluidically coupled with both the immersion chamber 40 and the water reservoir 30. A carafe 22 is configured to be selectively received in the vessel receiving area 20 of the housing 12, and a filter basket 24 is removeably supported on the carafe 22. The method includes the steps of 1) introducing a volume of water to the water reservoir 30; 2) heating the volume of water in the water reservoir 30; 3) introducing a first volume of a solid particulate to one of the immersion chamber 40 and the filter basket 24; 4) pumping a portion of the water from the water reservoir 30 to one of the immersion chamber 40 and the filter basket 24; 5) infusing the water with the solid particulate for a predetermined amount of time to brew a brewed beverage; and 6) introducing the brewed beverage into the carafe 22.

Thus, the coffee maker 10 of the present concept is able to produce a brewed beverage in a number of ways. For example, with reference to FIG. 7, the coffee maker 10 can prepare a brewed beverage by heating a volume of water in the water reservoir 30 and then pumping the water using the pump 118 via supply line 124 to the filter basket 24. As noted above, the main housing 70 of the filter basket 24 may include a filter assembly 84 (FIG. 5) having a solid particulate disposed therein. In this way, a pour-over brewing technique can be used with the coffee maker 10 of the present concept. Further, the coffee maker 10 of the present concept can also brew a beverage using in an immersion style brewing technique. In this technique, water can be heated in the water reservoir 30 and pumped to the lid assembly 42 of the immersion chamber 40 by the pump 118 via supply line 122. The immersion chamber 40 will have a volume of solid particulate disposed therein before the introduction of water into the cavity 43 of the immersion chamber 40 through the lid assembly 42. The water and solid particulate will combine to form a mixture in which the water is infused with the solid particulate. After a predetermined period of time for infusing the water in the cavity 43 of the immersion chamber 40, the mixture will move through the filter assembly 46 of the filter plate 44 and through the outlet 45 of the immersion chamber 40 when the valve assembly 100 is in an open position. In this way, the filtered contents will move through the outlet 102 of the upper portion 16 of the housing 12 towards the carafe receiving area 20 in a gravitational manner when that the valve assembly 100 is in an open position. The filtered and brewed beverage may enter the cavity 90 of the carafe 22 directly from the immersion chamber 40, or may pass through the filter basket 24. The filter basket 24, as noted above, may include a filter assembly 84 to filter the previously filtered and brewed beverage a second time before the beverage enters the cavity 90 of the carafe 22. In this way, the coffee maker 10 of the present concept is also configured to provide a filtered immersion brewing method.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A brewing device, comprising:
a base portion having a support surface;
a carafe configured to be selectively supported on the support surface;
a filter basket positioned above the carafe;
an immersion chamber fluidically coupled to an outlet disposed over the filter basket;
a water reservoir fluidically coupled to both the immersion chamber and the outlet; and
a pump in fluid communication with the water reservoir and operable to selectively advance water to one of the outlet and the immersion chamber from the water reservoir.

2. The brewing device of claim 1, wherein the immersion chamber includes a cavity having a filter plate with at least one filter assembly disposed therethrough.

3. The brewing device of claim 2, wherein the filter plate of the immersion chamber is coupled to one or more heating elements.

4. The brewing device of claim 3, including:
a handle assembly coupled to and extending upwardly from the filter plate.

5. The brewing device of claim 2, including:
a handle assembly extending outwardly from an outer surface of the cavity of the immersion chamber.

6. The brewing device of claim 1, including:
a removable filter enclosure having perforated sidewalls received in a cavity of the immersion chamber.

7. The brewing device of claim 1, wherein the immersion chamber and the water reservoir are supported on an upper portion of a housing over the base portion.

8. The brewing device of claim 7, wherein the filter basket is removeably supported on an upper portion of the carafe.

9. The brewing device of claim 7, including:
a divider member disposed between the immersion chamber and the water reservoir, wherein the divider member includes an internal raceway housing one or more supply lines to fluidically couple the immersion chamber to the pump.

10. The brewing device of claim 9, including:
a lid assembly operable between open and closed position relative to a cavity of the immersion chamber, the lid assembly having an outlet disposed thereon, wherein the outlet of the lid assembly is disposed over the cavity of the immersion chamber when the lid assembly is in the closed position.

11. The brewing device of claim 10, wherein the lid assembly is hingedly coupled to the divider member for pivoting movement between the open and closed positions.

12. A brewing device, comprising:
a housing having a base portion and an upper portion with a vessel receiving area disposed therebetween, wherein the upper portion includes an outlet opening into the vessel receiving area;
a carafe configured to be selectively received in the vessel receiving area;
a filter basket removeably supported on the carafe, the filter basket in fluid communication with the outlet opening of the upper portion of the housing when supported on the carafe as received in the vessel receiving area;
an immersion chamber removeably supported on the upper portion of the housing and having a cavity with a filter plate, the filter plate including an outlet fluidically coupled to the outlet opening of the upper portion of the housing;
a water reservoir supported on the upper portion of the housing; and
a pump in fluid communication with the water reservoir and operable to selectively advance water to one of the outlet opening into the vessel receiving area and the cavity of the immersion chamber from the water reservoir.

13. The brewing device of claim 12, including:
a divider member disposed between the immersion chamber and the water reservoir having an internal raceway.

14. The brewing device of claim 13, including:
a lid assembly operable between open and closed position relative to the cavity of the immersion chamber, the lid assembly having an outlet disposed thereon, wherein the outlet is disposed over the cavity of the immersion chamber when the lid assembly is in the closed position, wherein the lid assembly is coupled to the pump by at least one supply line routed through the internal raceway of the divider member.

15. The brewing device of claim 14, including:
a handle assembly coupled to an upper portion of the cavity of the immersion chamber.

16. The brewing device of claim 15, wherein the lid assembly is pivotally coupled to the divider member, and further wherein the handle assembly is concealed by the lid assembly when the lid assembly is in the closed position.

* * * * *